(12) United States Patent
Gendron-Bellemare et al.

(10) Patent No.: US 10,860,920 B2
(45) Date of Patent: Dec. 8, 2020

(54) DISTRIBUTIONAL REINFORCEMENT LEARNING

(71) Applicant: DeepMind Technologies Limited, London (GB)

(72) Inventors: Marc Gendron-Bellemare, London (GB); William Clinton Dabney, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/508,046

(22) Filed: Jul. 10, 2019

(65) Prior Publication Data

US 2019/0332923 A1 Oct. 31, 2019

Related U.S. Application Data

(63) Continuation of application No. PCT/EP2018/059628, filed on Apr. 16, 2018.

(60) Provisional application No. 62/485,720, filed on Apr. 14, 2017.

(51) Int. Cl.
*G06N 3/04* (2006.01)
*G06F 17/18* (2006.01)
*G06N 3/08* (2006.01)

(52) U.S. Cl.
CPC ........... *G06N 3/0472* (2013.01); *G06F 17/18* (2013.01); *G06N 3/08* (2013.01)

(58) Field of Classification Search
CPC ......... G06N 3/0472; G06N 3/08; G06F 17/18
See application file for complete search history.

(56) References Cited

U.S. PATENT DOCUMENTS

| | | | |
|---|---|---|---|
| 2005/0149463 A1* | 7/2005 | Bolt | G06N 3/08 706/20 |
| 2017/0076201 A1 | 3/2017 | Van Hasselt et al. | |
| 2018/0032863 A1* | 2/2018 | Graepel | G06N 5/003 |
| 2018/0098330 A1* | 4/2018 | Nguyen | H04W 72/0446 |

OTHER PUBLICATIONS

Rusu, Andrei A., et al. "Policy distillation." arXiv preprint arXiv:1511. 06295 (2015). (Year: 2015).*

(Continued)

*Primary Examiner* — Austin Hicks
(74) *Attorney, Agent, or Firm* — Fish & Richardson P.C.

(57) ABSTRACT

Methods, systems, and apparatus, including computer programs encoded on a computer storage medium, for selecting an action to be performed by a reinforcement learning agent interacting with an environment. A current observation characterizing a current state of the environment is received. For each action in a set of multiple actions that can be performed by the agent to interact with the environment, a probability distribution is determined over possible Q returns for the action-current observation pair. For each action, a measure of central tendency of the possible Q returns with respect to the probability distributions for the action-current observation pair is determined. An action to be performed by the agent in response to the current observation is selected using the measures of central tendency.

22 Claims, 4 Drawing Sheets

(56) References Cited

OTHER PUBLICATIONS

Foerster, Jakob N., et al. "Learning to communicate to solve riddles with deep distributed recurrent q-networks." arXiv preprint arXiv:1602.02672 (2016). (Year: 2016).*
Rusu, Andrei A., et al. "Policy distillation." arXiv preprint arXiv:1511.06295(2015). (Year: 2015).*
Foerster, Jakob N., et al. "Learning to communicate to solve riddles with deep distributed recurrent q-networks." arXiv preprint arXiv:1602.02672(2016). (Year: 2016).*
Elkan, Reinforcement Learning, Dec. 6, 2012, ucsd.edu (Year: 2012).*
Azar et al, "On the sample complexity of reinforcement learning with a generative model" Proeedings of the International Conference on Machine Learning, 2012, 8 pages.
Bellemare et al, "The arcade learning environment: An evaluation platform for general agents" Journal of Artificial Intelligence Research, Jun. 2013, 27 pages.
Bellemare et al, "The cramer distance as a solution to biased wasserstein gradients" arXiv, May 2017, 20 pages.
Bickel et al, "Some asymptotic theory for the bootstrap" The Annals of Statistics, 1981, 22 pages.
Caruana, "Multitask learning" Machine Learning, 1997, 35 pages.
Chung et al, "Discounted mdps: Distribution functions and exponential utility maximization," Society for Industrial and Applied Mathamatics, Jan. 1987, 14 pages.
Dearden et al, "Bayesian Q-learning" Proceedings of the National Conference on Artificial Intelligence, 1998, 8 page.
Engel et al, "Reinforcement learning with gaussian processes" Proceedings of the International Conference on Machine Learning, 2005, 8 pages.
Geist et al, "Kalman temporal differences" Journal of Artificial Intelligence Research, Oct. 2010, 50 pages.
Gordon, "Stable function approximation in dynamic programming" Proceedings of the Twelfth International Conference on Machine Learning, 1995, 8 pages.
Harutyunyan et al, "Q($\lambda$) with Off-Policy Corrections" arXiv, Aug. 2016, 15 pages.
Hoffman et al, "An expectation maximization algorithm for continuous markov decision processes with arbitrary reward" Proceedings of the International Conference on Artificial Intelligence and Statistics, 2009, 8 pages.
Jaderberg et al, "Reinforcement learning with unsupervised auxiliary tasks" arXiv, Nov. 2016, 14 pages.
Jaquette, "Markov decision processes with a new optimality criterion" Discrete time The Annals of Statistics, 1973, 10 pages.
Kakade et al, "Approximately optimal approximate reinforcement learning" Proceedings of the International Conference on Machine Learning, 2002, 8 pages.
Kingma et al, "Adam: A method for stochastic optimization" arXiv, Jul. 2015, 15 pages.
Lattimore et al, "PAC bounds for discounted MDPs" Proceedings of the Conference on Algorithmic Learning Theory, 2012, 15 pages.
Mannor et al, "Mean-variance optimization in markov decision processes" Proceedings in the 28th International Conference on Machine Learning, 2011, 8 pages.
McCallum, "Reinforcement learning with selective perception and hidden state" PhD thesis, Universirt of Rochester, 1995, 157 pages.
Mnih et al, "Human-level control through deep reinforcement learning," Nature, Feb. 26, 2015, 13 pages.
Morimura et al, "Nonparametric return distribution approximation for reinforcement learning" Proceedings of the 27th International Conference on Machine Learning, 2010, 8 pages.
Morimura et al, "Parametric return density estimation for reinforcement learning" Proceedings of the Conference on Uncertainty in Artificial Intelligence, 2010, 8 pages.
Nair et al, "Massively parallel methods for deep reinforcement learning" arXiv, Jul. 2015, 14 pages.
PCT International Search Report and Written Opinion of International Application No. PCT/EP2018/059628, dated Jul. 24 2018, 19 pages.
Prashanth et al, "Actor-critic algorithms for risk-sensitive mdps" Advances in Neural Information Processing Systems, Oct. 2013, 24 pages.
Rösler, "A fixed point theorem for distributions" Stochastic Processes and their Applications, 1992, 20 pages.
Schaul et al, "Prioritized experience replay" arXiv, Feb. 2016, 21 pages.
Sobel, "The variance of discounted markov decision processes" Journal of Applied Probability, Dec. 1982, 10 pages.
Sutton et al, "Horde: A scalable real-time architecture for learning knowledge from unsupervised sensorimotor interaction" Proceedings of the International Conference on Autonomous Agents and Multiagents Systems, May 2011, 8 pages.
Tamar et al, "Learning the variance of the reward-to-go" Journal of Machine Learning Research, Mar. 2016, 36 pages.
Tieleman et al, "Lecture 6.5-rmsprop: Divide the gradient by running average of its recent magnitude" COURSERA: Neural Networks for Machine Learning, Abstract, 2012, 2 pages.
Toussaint et al, "Probabilistic inference for solving discrete and continuous state markov decision processes" Proceedings of the International Conference on Machine Learning, 2006, 8 pages.
Tsitsiklis, "On the convergence of optimistic policy iteration" Journal of Machine Learning Research, Jul. 2002, 14 pages.
Utgoff et al, "Many-layered learning" Massachusetts Institute of Technology, 2002, 27 pages.
Van den Oord et al, "Pixel recurrent neural networks" arXiv, Aug. 2016, 11 pages.
van Hasselt et al, "Deep reinforcement learning with double Q-learning" AAAI Conference on Artificial Intelligence, 2016, 7 pages.
Veness et al, "Compress and control" AAAI Conference on Artificial Intelligence, 2015, 8 pages.
Wang et al, "Dual representations for dynamic programming" Journal of Machine Learning, 2008, 29 pages.
Wang et al, "Dueling network architectures for deep reinforcement learning" arXiv, Apr. 2016, 15 pages.
White, "Mean, variance, and probabilistic criteria in finite markov decision processes: a review," JOTA, Jan. 1988, 29 pages.
Zolna, "Improving the Performance of Neural Networks in Regression Tasks Using Drawering", arXiv, Cornell University Library, Dec. 6, 2016, 6 pages.
PCT International Preliminary Report on Patentability in International Appln. No. PCT/EP2018/059628, dated Oct. 15, 2019, 13 pages.
EP Office Action in European Appln. No. 18717923.9, dated Sep. 3, 2020, 14 pages.

* cited by examiner

DISTRIBUTIONAL REINFORCEMENT LEARNING

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a reinforcement learning system implemented as computer programs on one or more computers in one or more locations.

According to a first aspect there is provided a method for selecting an action to be performed by a reinforcement learning agent interacting with an environment. The method includes receiving a current observation characterizing a current state of the environment. For each action in a set of multiple actions that can be performed by the agent to interact with the environment, the action and the current observation are processed using a distributional Q network with multiple network parameters. The distributional Q network is a deep neural network that is configured to process the action and the current observation in accordance with current values of the network parameters to generate a network output that defines a probability distribution over possible Q returns for the action-current observation pair. Each possible Q return is an estimate of a return that would result from the agent performing the action in response to the current observation. For each action, a measure of central tendency of the possible Q returns with respect to the probability distribution for the action-current observation pair is determined. An action is selected to be performed by the agent in response to the current observation using the measures of central tendency for the actions.

In some implementations, selecting an action to be performed by the agent includes selecting an action having the highest measure of central tendency.

In some implementations, selecting an action to be performed by the agent includes selecting an action having the highest measure of central tendency with probability $1-\varepsilon$ and selecting an action randomly from the plurality of actions with probability $\varepsilon$.

In some implementations, the network output includes a respective output value for each of a plurality of possible Q returns for the action-current observation pair.

In some implementations, the measure of central tendency is a mean of the possible Q returns.

In some implementations, determining the mean of the possible Q returns with respect to the probability distribution includes determining a respective probability for each of the plurality of possible Q returns from the output values. Each possible Q return is weighted by the probability for the possible Q return. The mean is determined by summing the weighted possible Q returns.

According to a second aspect, there is provided a method of training the distributional Q network. The method includes obtaining an experience tuple that includes (i) a current training observation, (ii) a current action performed by the agent in response to the current training observation, (iii) a current reward received in response to the agent performing the current action, and (iv) a next training observation characterizing a state that the environment transitioned into as a result of the agent performing the current action. A respective current probability for each Q return of the plurality of possible Q returns is determined. More specifically, the current training observation and the current action are processed using the distributional Q network and in accordance with current values of the network parameters to generate a current network output that defines a current probability distribution over possible Q returns for the current action-current training observation pair. For each action, the action and the next training observation are processed using a target distributional Q network (or, in some cases, the distributional Q network) and in accordance with current values of target network parameters of the distributional Q network to generate a next network output for the action-next training observation pair. The next network output defines a next probability distribution over possible Q returns for the action-next training observation pair. The target distributional Q network has the same neural network architecture as the distributional Q network but the current values of the target network parameters are different from the current values of the network parameters. For each action, a measure of central tendency of the possible Q returns with respect to the respective next probability distribution for the action-next training observation pair is determined. An argmax action is determined, where the argmax action is an action for which the measure of central tendency of the possible Q returns is highest. A respective projected sample update is determined for each of the possible Q returns using the current reward and the argmax action. A gradient is determined with respect to the network parameters of a loss function that depends on the projected sample updates for the possible Q returns and the current probabilities for the possible Q returns. The current values of the network parameters are updated using the gradient.

In some implementations, determining a respective projected sample update for each of the possible Q returns using the current reward and the argmax action includes determining a respective sample update for each of the possible Q returns from the current reward. The respective projected sample update is determined for each of the possible Q returns from the respective sample updates and the probabilities in the next probability distribution for the argmax action-next training observation pair.

In some implementations, the respective sample update for each of the possible Q returns is equal to the current reward plus a product of a discount factor and the possible Q return. The respective sample update may be determined subject to a constraint that the respective sample update not be less than a smallest possible Q return of the plurality of possible Q returns and not be greater than a largest possible Q return of the plurality of possible Q returns.

In some implementations, determining the respective projected sample update for each of the possible Q returns from the respective sample updates and the probabilities in the next probability distribution for the argmax action-next training observation pair includes, for each possible Q return, distributing the probability for the possible Q return in the next probability distribution for the argmax action-next training observation pair to at least some of the projected sample updates. The probability is distributed with a strength that is based on, for each projected sample update, the distance between the sample update for the possible Q return and the corresponding possible Q return for the projected sample update.

In some implementations, the loss function is a Kullback-Leibler divergence between (i) the respective projected sample updates and (ii) the current probability distribution.

In some implementations, the possible Q returns are indexed from 0 to N−1. Determining the respective projected sample update includes, for each particular possible Q return of the plurality of possible Q returns, remapping the sample update for the particular possible Q return to fall in a range of 0 to N−1. A floor and a ceiling of the remapped sample update are determined. The projected sample update for the possible Q return having an index that matches the floor is updated based on the probability for the particular possible Q return in the next probability distribution for the argmax action-next training observation pair and on a distance between the remapped sample update and the ceiling. The projected sample update for the possible Q return having an index that matches the ceiling is updated based on the probability for the particular possible Q return in the next probability distribution for the argmax action-next training observation pair and on a distance between the remapped sample update and the floor.

In some implementations, the loss function is a negative of a sum of, for each possible Q return, the projected sample update for the possible Q return and a logarithm of the current probability for the possible Q return.

In some implementations, the method further includes periodically updating the values of the target network parameters to match the values of the network parameters.

In some implementations, the method further includes updating the current values of the target network parameters by interpolating between the current values of the target network parameters and the updated values of the network parameters.

According to a third aspect, there is provided a system including one or more computers and one or more storage devices storing instructions that when executed by the one or more computers cause the one or more computers to perform the respective operations of the previously described methods.

According to a fourth aspect, there is provided a computer program product storing instructions that when executed by one or more computers cause the one or more computers to perform the respective operations of the previously described methods.

Particular embodiments of the subject matter described in this specification can be implemented so as to realize one or more of the following advantages.

The reinforcement learning system as described in this specification selects actions to be performed by the agent using a distributional Q neural network. For a given action-observation pair, the distributional Q network generates outputs that define a probability distribution over a set of possible Q returns (i.e., numerical values that estimate a return that would result from the agent performing the action in response to the observation). The probability distribution may be defined based on a plurality of numerical values, of which at least two are used in selecting the action to be performed by an agent. In contrast, some conventional systems select actions using conventional Q neural networks that, for a given action-observation pair, generate a single expected Q return for the pair. By modelling probability distributions over Q returns for action-observation pairs, rather than single expected Q returns (i.e., as in some conventional systems), the system as described in this specification can learn a richer (and thereby more effective) action selection model. For example, the system as described in this specification can select actions to be performed by an agent interacting with an environment more effectively (e.g., to allow the agent to more effectively perform a particular task) than some conventional systems.

Moreover, the system as described in this specification can be trained based on a loss function that depends on full Q return probability distributions, rather than single expected Q returns (i.e., as in some conventional systems), thereby yielding more stable parameter value updates. Parameter value updates are referred to as stable if they consistently cause the system to select actions that enable the agent to effectively perform tasks. By enabling more stable parameter value updates, the system as described in this specification may consume fewer computational resources (e.g., computing power and memory) during training than some conventional systems. For example, the system as described in this specification may require fewer iterations of a training procedure and less training data to achieve an acceptable level of performance than some conventional systems.

In some cases, the system as described in this specification may be used to select actions to be performed by a robotic agent interacting with a real-world environment. In these cases, the system as described in this specification may enable the robotic agent to achieve acceptable performance more quickly, to perform actions which more effectively accomplish tasks, and to more readily adapt to previously unseen environments, than if the actions to be performed by the robotic agent were selected by a conventional system. For example, the agent may be a robotic agent that performs tasks such as moving objects between locations (e.g., in a shipping warehouse), assembling components (e.g., electronic components in a manufacturing environment), or navigating between locations (e.g., as an autonomous or semi-autonomous vehicle). By selecting the actions to be performed by the agent based on a full Q return distribution rather than a single expected Q return, the system as described in this specification may enable the robotic agent to perform tasks more quickly and more safely, even in previously unseen environmental conditions (e.g., if the agent is an autonomous vehicle operating in heavy traffic or snowfall).

The details of one or more embodiments of the subject matter of this specification are set forth in the accompanying drawings and the description below. Other features, aspects, and advantages of the subject matter will become apparent from the description, the drawings, and the claims. The subject matter may be expressed as computer-implemented methods, a computer systems configured to perform the methods, or as a computer program product (e.g. one of more computer storage media, or, in another example, software as it is transmitted over a communication network) storing program instructions for causing a computer systems to perform one of the methods.

BRIEF DESCRIPTION OF THE DRAWINGS

Like reference numbers and designations in the various drawings indicate like elements.

DETAILED DESCRIPTION

Figure 1:
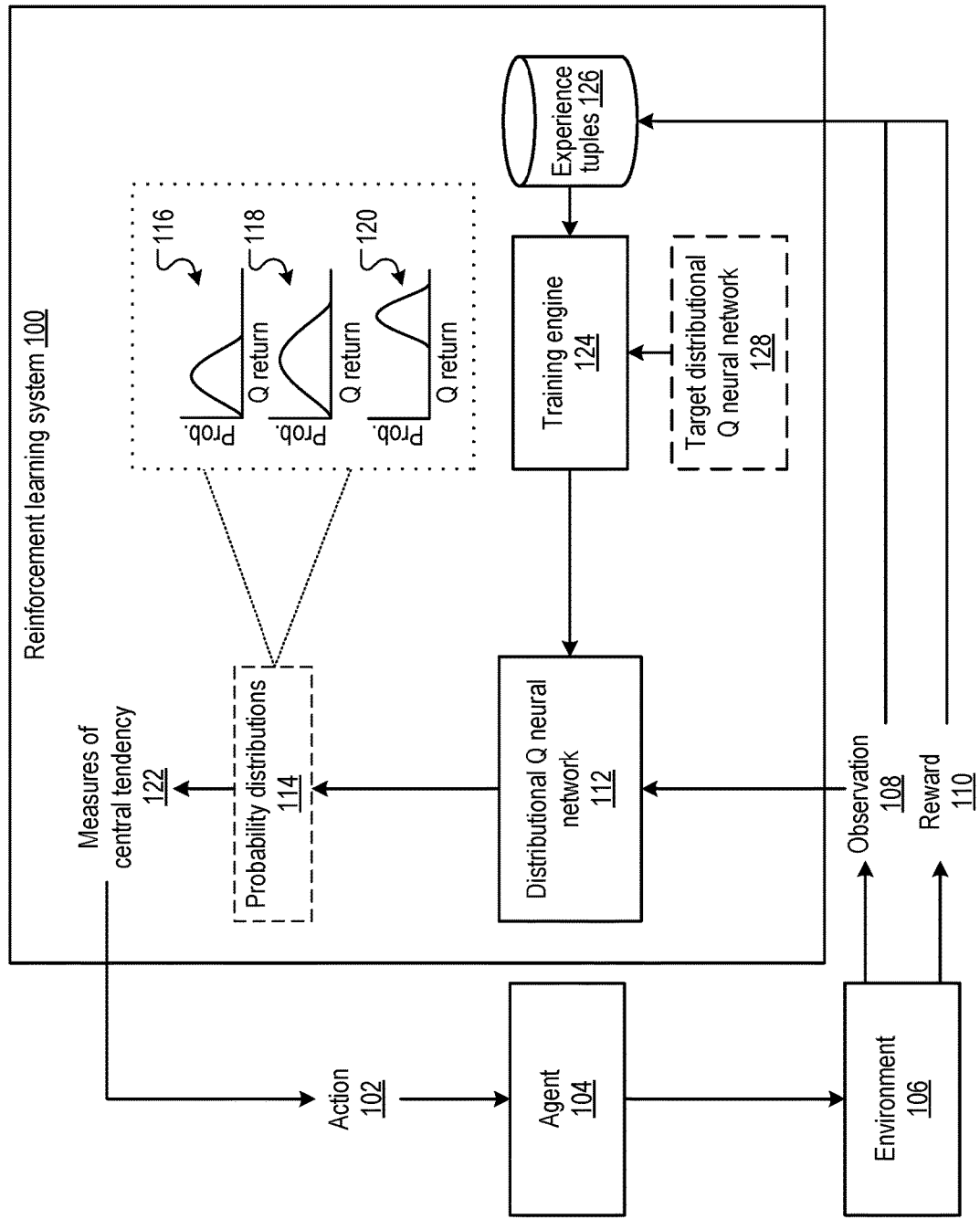
FIG. 1 is a block diagram of an example reinforcement learning system.

FIG. 1 is a block diagram of an example reinforcement learning system 100. The reinforcement learning system 100 is an example of a system implemented as computer programs on one or more computers in one or more locations in which the systems, components, and techniques described below are implemented.

The reinforcement learning system 100 selects actions 102 to be performed by an agent 104 interacting with an environment 106 at each of multiple time steps. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 108.

The system 100 described herein is widely applicable and is not limited to one specific implementation. However, for illustrative purposes, a small number of example implementations are described below.

In some implementations, the environment 106 is a real-world environment and the agent 104 is a mechanical agent interacting with the real-world environment. For example, the agent 104 may be a robot interacting with the environment 106 to accomplish a specific task. As another example, the agent 104 may be an autonomous or semi-autonomous vehicle navigating through the environment 106. In these implementations, the actions 102 may be control inputs to control the robot or the autonomous vehicle. In some of these implementations, the observations 108 may be generated by or derived from sensors of the agent 104. For example, the observations 108 may be captured by a camera of the agent 104. As another example, the observations 108 may be derived from data captured from a laser sensor of the agent 104. As another example, the observations 108 may be hyperspectral images captured by a hyperspectral sensor of the agent 104.

In some implementations, the environment 106 may be a simulated environment and the agent 104 may be implemented as one or more computer programs interacting with the simulated environment. For example, the simulated environment 106 may be a video game and the agent 104 may be a simulated user playing the video game. As another example, the simulated environment 106 may be a motion simulation environment, e.g., a driving simulation or a flight simulation, and the agent 104 is a simulated vehicle navigating through the motion simulation environment. In these implementations, the actions 102 may be control inputs to control the simulated user or simulated vehicle.

At each time step, the state of the environment 106 at the time step (as characterized by the observation 108) depends on the state of the environment 106 at the previous time step and the action 102 performed by the agent 104 at the previous time step.

At each time step, the system 100 may receive a reward 110 based on the current state of the environment 106 and the action 102 of the agent 104 at the time step. In general, the reward 110 is a numerical value. The reward 110 can be based on any event or aspect of the environment 106. For example, the reward 110 may indicate whether the agent 104 has accomplished a task (e.g., navigating to a target location in the environment 106) or the progress of the agent 104 towards accomplishing a task.

The system 100 includes a distributional Q neural network 112 that is configured to process an input (referred to in this specification as an action-observation pair) including: (i) an action 102 from a set of actions that can be performed by the agent 104, and (ii) an observation 108. The distributional Q network 112 is configured to process the action-observation pair in accordance with current values of distributional Q network parameters to generate an output that defines a probability distribution 114 over a set of possible Q returns for the action-observation pair. For a given action-observation pair, a Q return (which can also be referred to as a Q value) is a numerical value that is an estimate of a return that would result from the agent 104 performing the action in response to the observation. A return refers to a cumulative measure of reward received by the system 100 as the agent 104 interacts with the environment 106 over multiple time steps. For example, a return may refer to a long-term time-discounted reward received by the system 100.

The set of possible Q returns for an action-observation pair is a set of numerical values. The set of possible Q returns may be a continuous set or a discrete set. For example, the possible Q returns for an action-observation pair may be the continuous range: $[-2, 2]$, or the discrete set: $\{-2, -1, 0, 1, 2\}$.

The output of the distributional Q network 112 is an ordered collection of numerical values (e.g., a vector or a matrix). In some cases, particularly when the set of possible Q returns is a discrete set, the output of the distributional Q network 112 includes a respective output value for each Q return in the set of possible Q returns. In these cases, output of the distributional Q network may define a probability distribution 114 over the set of possible Q returns if the respective output values for each Q return are processed by, for example, a soft-max function, thereby determining a respective probability value for each Q return. In some cases, the output of the distributional Q network 112 includes respective output values that define a parametric probability distribution over the set of possible Q returns. For example, the output of the distributional Q network 112 may include respective output values defining a mean and a standard deviation of a Normal distribution over the set of possible Q returns.

The distributional Q network 112 may be implemented as any appropriate deep neural network model. For example, the distributional Q network 112 may be implemented as a feed-forward neural network (e.g., a multi-layer perceptron or a convolutional neural network) or a recurrent neural network (e.g., a long short-term memory network).

The system 100 uses the distributional Q network 112 in selecting actions 102 to be performed by the agent 104 in response to observations 108 at each time step. In particular, at each time step, for each action from the set of actions that can be performed by the agent, the system 100 provides the action-current observation pair as an input to the distributional Q network 112. The distributional Q network 112 processes each action-current observation pair to generate outputs that define respective probability distributions 114 over the set of possible Q returns for each action-current observation pair.

For example, the outputs of the distributional Q network 112 may define: (i) a first probability distribution 116 over the set of possible Q returns for a first action-current observation pair, (ii) a second probability distribution 118 over the set of possible Q returns for a second action-current observation pair, and (iii) a third probability distribution 120 over the set of possible Q returns for a third action-current observation pair.

For each action, the system 100 determines a corresponding measure of central tendency 122 (i.e., a central or typical value) of the set of possible Q returns with respect to the probability distribution defined by the output of the distributional Q network 112 for the action-current observation pair. For example, as will be described further with reference to FIG. 2, the measure of central tendency may be a mean, a median, or a mode.

The system 100 selects an action 102 to be performed by the agent 104 at the time step based on the measures of central tendency 122 corresponding to the actions. In some implementations, the system 100 selects an action having a highest corresponding measure of central tendency 122 from amongst all the actions in the set of actions that can be performed by the agent 104. In some implementations, the system 100 selects an action in accordance with an exploration strategy. For example, the system 100 may use an $\epsilon$-greedy exploration strategy. In this example, the system 100 may select an action having a highest corresponding measure of central tendency with probability $1-\epsilon$, and select an action randomly with probability $\epsilon$, where $\epsilon$ is a number between 0 and 1.

The system 100 includes a training engine 124 that is configured to train the distributional Q network 112 over multiple training iterations using reinforcement learning techniques. The training engine 124 trains the distributional Q network 112 by iteratively (i.e., at each training iteration) adjusting the current values of the distributional Q network parameters. By training the distributional Q network 112, the training engine 124 may, for example, cause the distributional Q network 112 to generate outputs that result in the selection of actions 102 to be performed by the agent 104 which increase a cumulative measure of reward received by the system 100. By increasing a cumulative measure of reward received by the system 100 (e.g., a long-term time-discounted reward), the training engine 124 may (by extension) cause the agent 104 to perform given tasks more effectively.

The training engine 124 trains the distributional Q network 112 based on training data including a set of multiple experience tuples 126. Each experience tuple includes data indicating: (i) a training observation, (ii) an action performed by the agent in response to the training observation, (iii) a reward received in response to the agent performing the action, and (iv) a next training observation characterizing a state that the environment transitioned into as a result of the agent performing the action. The set of experience tuples 126 may include online experience tuples, offline experience tuples, or both. An online experience tuple refers to an experience tuple where the action included in the experience tuple was selected based on outputs generated by the distributional Q network 112 in accordance with current values of distributional Q network parameters. An offline experience tuple refers to an experience tuple where the action included in the experience tuple was selected based on any appropriate action selection policy (e.g., a random action selection policy).

As will be described further with reference to FIG. 3, at each training iteration, the training engine 124 may obtain and process an experience tuple to determine, for each possible Q return, a numerical value referred to in this specification as a projected sample update for the Q return. The training engine 124 may determine a gradient of a loss function (e.g., that depends on the projected sample updates) with respect to the distributional Q network parameters and update the current values of the distributional Q network parameters using the gradient. The loss function may, for example, encourage the distributional Q network 112 to generate an output (i.e., in response to processing the action-training observation pair) that defines a probability distribution where the probability value for each Q return is similar to the projected sample update for the Q return. That is, the loss function may encourage the distributional Q network 112 to generate an output that defines a probability distribution over possible Q returns where at least one numerical measure of similarity (e.g., a Kullback-Leibler divergence measure) between the probability distribution and the projected sample updates is increased. Therefore, in some cases, the set of projected sample updates may be interpreted as target values for the probability distribution defined by the output of the distributional Q network 112.

In some implementations, the system 100 includes a target distributional Q network 128. Generally, the target distributional Q network 128 has the same neural network architecture (e.g., number of layers, neuron topology, and the like) as the distributional Q network 112. Moreover, the target distributional Q network 128 is also (similar to the distributional Q network 112) configured to process action-observations pairs to generate outputs that define probability distributions over the set of possible Q returns. However, the values of the target distributional Q network parameters may be different than values of the corresponding distributional Q network parameters. As will be described further with reference to FIG. 3, the training engine 124 may use the target distributional Q network 128 in determining projected sample updates for Q returns during training.

The system 100 may periodically (e.g., after given numbers of training iterations) update the values of the target distributional Q network parameters based on the current values of the distributional Q network parameters. For example, the system 100 may update the values of the target distributional Q network parameters to match the current values of the distributional Q network parameters. As another example, the system 100 may update the values of the target distributional Q network parameters by interpolating between the current values of the target distributional Q network parameters and the current values of the distributional Q network parameters. For example, the system 100 may set the value of each target distributional Q network parameter to be an average of the current value of the target distributional Q network parameter and the value of the corresponding distributional Q network parameter.

Figure 2:
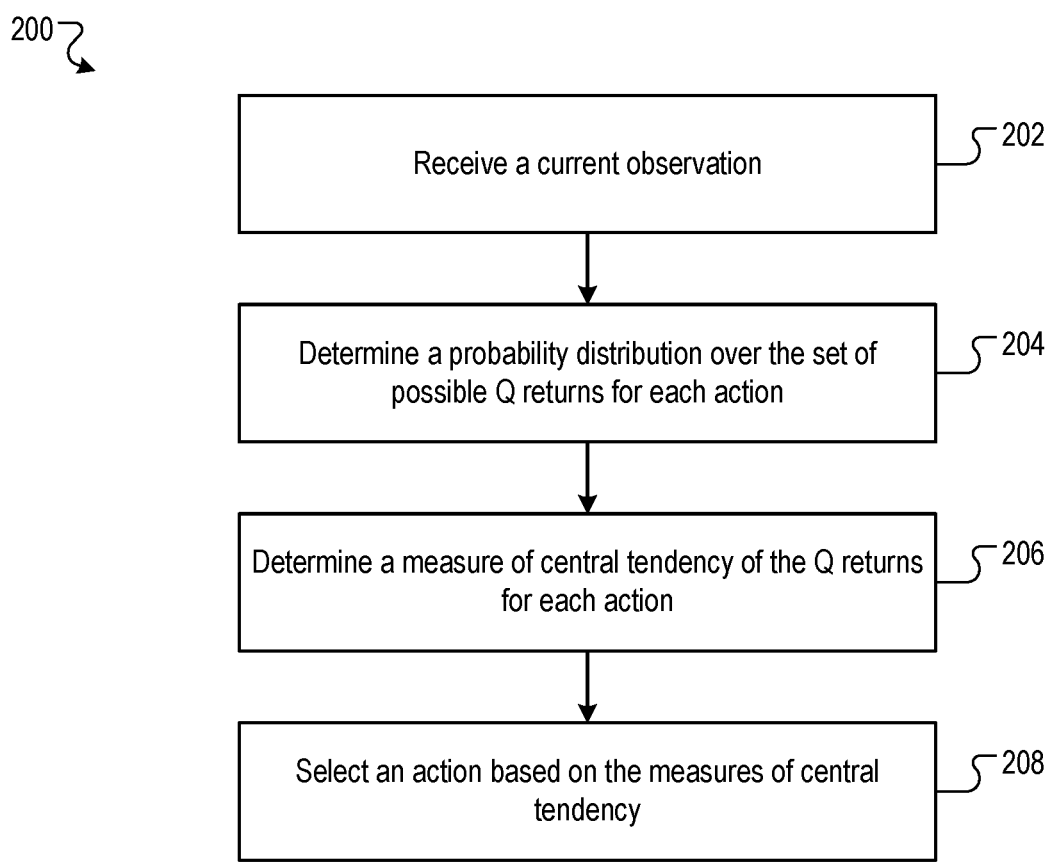
FIG. 2 is a flow diagram of an example process for selecting an action to be performed by an agent using a reinforcement learning system.

FIG. 2 is a flow diagram of an example process for selecting an action to be performed by an agent using a reinforcement learning system. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives a current observation characterizing a current state of the environment (202). The current observation may be generated by or derived from sensors of the agent. For example, the current observation may be captured by a camera of the agent. As another example, the current observation may be derived from data captured from a laser sensor of the agent. As another example, the current observation may be a hyperspectral image captured by a hyperspectral sensor of the agent.

For each action from a set of actions that can be performed by the agent, the system determines a corresponding probability distribution over a set of possible Q returns (204). More specifically, for each action, the system provides the action-current observation pair as an input to a distributional Q neural network. The distributional Q network processes each action-current observation pair in accordance with current values of distributional Q network parameters to generate a respective output. For each action-current observation pair processed by the distributional Q network, the output generated by the distributional Q network defines a respective probability distribution over the set of possible Q returns.

The set of possible Q returns for an action-observation pair is a set of numerical values. The set of possible Q returns may be a continuous set or a discrete set. For example, the possible Q returns for an action-observation pair may be the continuous range: [−2, 2], or the discrete set: {−2, −1, 0, 1, 2}.

For a given action-observation pair, the output of the distributional Q network is an ordered collection of numerical values (e.g., a vector or a matrix). In some cases, particularly when the set of possible Q returns is a discrete set, the output of the distributional Q network includes a respective output value for each Q return in the set of possible Q returns. In these cases, output of the distributional Q network may define a probability distribution over the set of possible Q returns if the respective output values for each Q return are processed by, for example, a soft-max function, thereby determining a respective probability value for each Q return. In some cases, the output of the distributional Q network includes respective output values that define a parametric probability distribution over the set of possible Q returns. For example, the output of the distributional Q network may include respective output values defining a mean and a standard deviation of a Normal distribution over the set of possible Q returns.

The distributional Q network may be implemented as any appropriate deep neural network model. For example, the distributional Q network may be implemented as a feed-forward neural network (e.g., a multi-layer perceptron or a convolutional neural network) or a recurrent neural network (e.g., a long short-term memory network).

For each action, the system determines a corresponding measure of central tendency (i.e., a central or typical value) of the set of possible Q returns with respect to the probability distribution defined by the output of the distributional Q network for the action-current observation pair (206). The measure of central tendency may be, for example, a mean, a median or a mode. In a particular example, the measure of central tendency is the mean and the set of possible Q returns is a discrete set. In this example, for each action, the system may weight each Q return in the set of possible Q returns by the probability for the Q return according to the probability distribution defined by the output of the distributional Q network for the action-current observation pair. Next the system may determine the mean by summing the weighted Q returns. That is, the system may determine the measure of central tendency m for an action by:

$$m = \sum_i p_i \cdot q_i \qquad (1)$$

where i indexes the possible Q returns $\{q_i\}$ and $p_i$ is probability value for Q return $q_i$ according to the probability distribution defined by the output of the distributional Q network for the action-current observation pair.

The system selects an action to be performed by the agent based on the measures of central tendency corresponding to the actions (208). In some implementations, the system selects an action having a highest corresponding measure of central tendency from amongst all the actions in the set of actions that can be performed by the agent. In some implementations, the system selects an action in accordance with an exploration strategy. For example, the system may use an $\epsilon$-greedy exploration strategy. In this example, the system may select an action having a highest corresponding measure of central tendency with probability 1−$\epsilon$, and select an action randomly with probability $\epsilon$, where $\epsilon$ is a number between 0 and 1.

Figure 3:
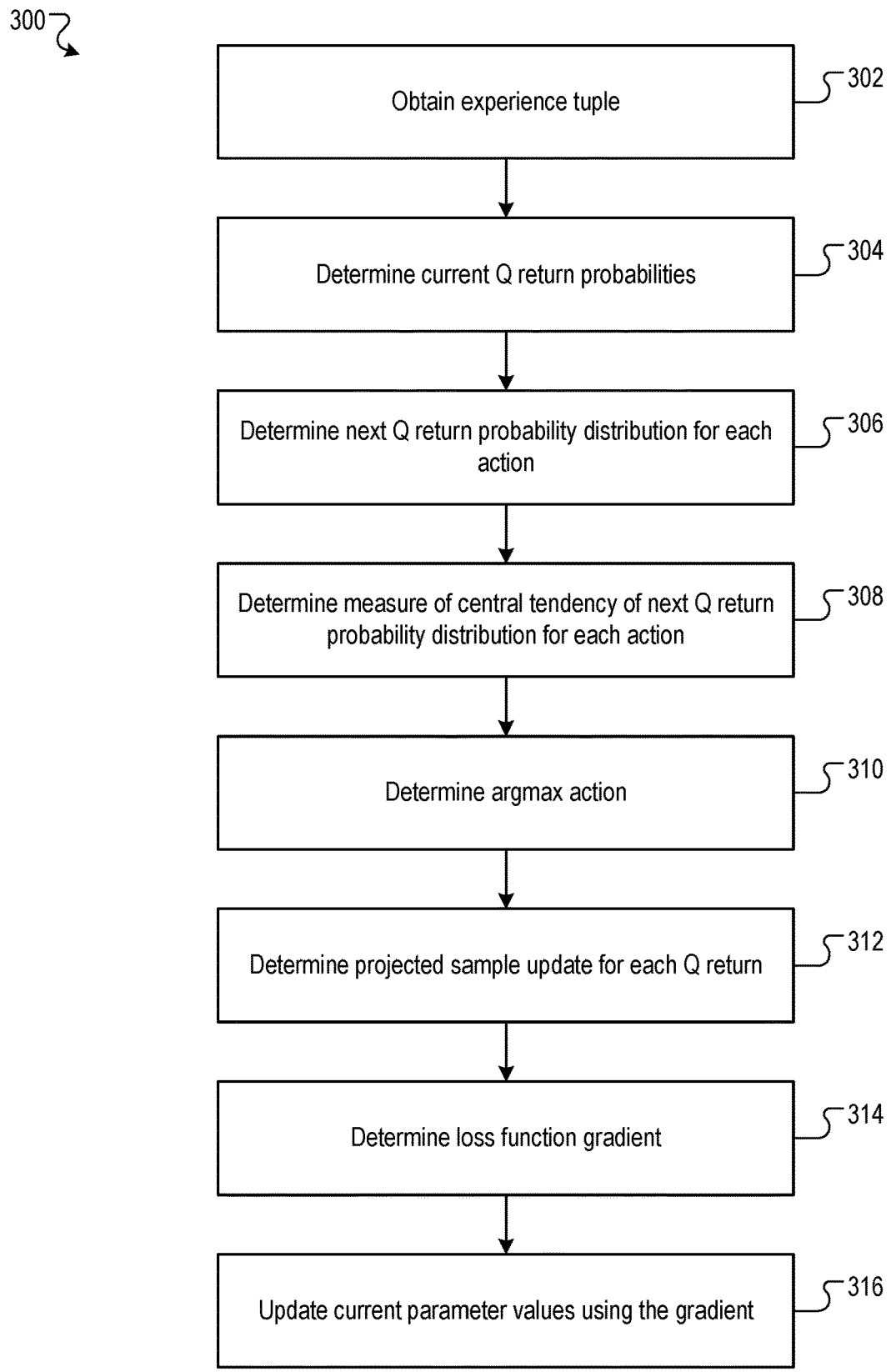
FIG. 3 is a flow diagram of an example process for training a reinforcement learning system.

FIG. 3 is a flow diagram of an example process for training a reinforcement learning system. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system obtains an experience tuple (302). The experience tuple includes data indicating: (i) a current training observation, (ii) a current action performed by the agent in response to the training observation, (iii) a current reward received in response to the agent performing the action, and (iv) a next training observation characterizing a state that the environment transitioned into as a result of the agent performing the action. The experience tuple may be an online experience tuple or an offline experience tuple. An online experience tuple refers to an experience tuple where the action included in the experience tuple was selected based on outputs generated by the distributional Q network in accordance with current values of distributional Q network parameters (e.g., as described with reference to FIG. 2). An offline experience tuple refers to an experience tuple where the action included in the experience tuple was selected based on any appropriate action selection policy (e.g., a random action selection policy).

The system determines a respective current probability for each Q return in the set of possible Q returns (304). More specifically, the system provides the current action-current training observation pair (i.e., from the experience tuple obtained in 302) as an input to a distributional Q network. The distributional Q network processes the current action-current training observation pair in accordance with current values of distributional Q network parameters to generate an output. The output generated by the distributional Q network defines a probability distribution over the set of possible Q returns, and in particular, defines a respective current probability for each Q return. For example, if the output of the distributional Q network includes a respective output value for each Q return, then the system may determine a current probability for each Q return by processing the respective output values using a soft-max function.

For each action that can be performed by the agent, the system determines a corresponding next probability distribution over the set of possible Q returns (306). More specifically, for each action, the system provides the action-next training observation pair as an input to the distributional Q network. The distributional Q network processes each action-next training observation pair in accordance with current values of distributional Q network parameters to generate a respective output. For each action-next training observation pair processed by the distributional Q network, the output generated by the distributional Q network defines a respective next probability distribution over the set of possible Q returns.

In some implementations, to determine the corresponding next probability distributions, rather than processing each action-next training observation pair using the distributional Q network, the system processes each action-next training observation pair using a target distributional Q network. Generally, the target distributional Q network has the same neural network architecture (e.g., number of layers, neuron topology, and the like) as the distributional Q network. Moreover, the target distributional Q network is also (similar to the distributional Q network) configured to process action-observations pairs to generate outputs that define probability distributions over the set of possible Q returns. However, the values of the target distributional Q network parameters may be different than values of the corresponding distributional Q network parameters.

For each action, the system determines a corresponding measure of central tendency of the set of possible Q returns with respect to the probability distribution defined by the output of the distributional Q network (or the target distributional Q network) for the action-next training observation pair (308). The measure of central tendency may be, for example, a mean, a median or a mode. An example of determining a measure of central tendency of the set of possible Q returns with respect to a probability distribution is described with reference to 206.

The system determines an action, referred to as the argmax action, based on the measure of central tendency corresponding to the actions (e.g., as determined in 308) (310). For example, the system determines the argmax action as an action having a highest corresponding measure of central tendency from amongst all the actions in the set of actions that can be performed by the agent.

For each Q return in the set of possible Q returns, the system determines a respective numerical value referred to in this specification as a projected sample update for the Q return (312). Generally, the system determines the projected sample updates for the Q returns based on the current reward (i.e., from the experience tuple obtained in 302) and the argmax action (i.e., as determined in 310). An example process for determining projected sample updates for Q returns is described with reference to FIG. 4.

The system determines a gradient of a loss function with respect to the distributional Q network parameters (314). Generally, the loss function depends on the projected sample updates for the Q returns (i.e., as determined in 312) and the current probabilities for the Q returns (i.e., as determined in 304). In some cases, the loss function encourages the distributional Q network to generate an output (i.e., in response to processing the current action-current training observation pair) that defines a probability distribution where the probability value for each Q return is similar to the projected sample update for the Q return. For example, the loss function may be divergence (e.g., a Kullback-Leibler divergence) between (i) the projected sample updates for the Q returns, and (ii) the current probabilities of the Q returns. That is, the loss function $\mathcal{L}$ may be given by:

$$\mathcal{L} = KL(M\|P) \qquad (2)$$

where M represents the projected sample updates for the Q returns and P represents the current probabilities of the Q returns. As another example, when the set of possible Q returns is a discrete set, the loss function may be a negative of a sum of, for each Q return, the projected sample update for the Q return and a logarithm of the current probability for the Q return. That is, the loss function $\mathcal{L}$ may be given by:

$$\mathcal{L} = -\sum_i m_i \log p_i \qquad (3)$$

where i indexes the set of possible Q returns, and for each i, $m_i$ is the projected sample update for the i-th Q return, and $p_i$ is the current probability value for the i-th Q return.

Generally, the system may determine the gradient of the loss function with respect to the distributional Q network parameters by any appropriate method. For example, the system may determine the gradient by a backpropagation procedure.

The system updates the current values of the distributional Q network parameters using the gradient of the loss function (316). For a given parameter $\theta$ of the distributional Q network, the system may update the current value of the parameter by:

$$\theta \leftarrow \theta - r \cdot \nabla_\theta \mathcal{L} \qquad (4)$$

where r is a positive learning rate hyper-parameter (i.e., a system hyper-parameter governing how quickly parameter values can change during training) and $\nabla_\theta \mathcal{L}$ is the gradient of the loss function with respect to the parameter $\theta$ (e.g., as determined in 314).

Figure 4:
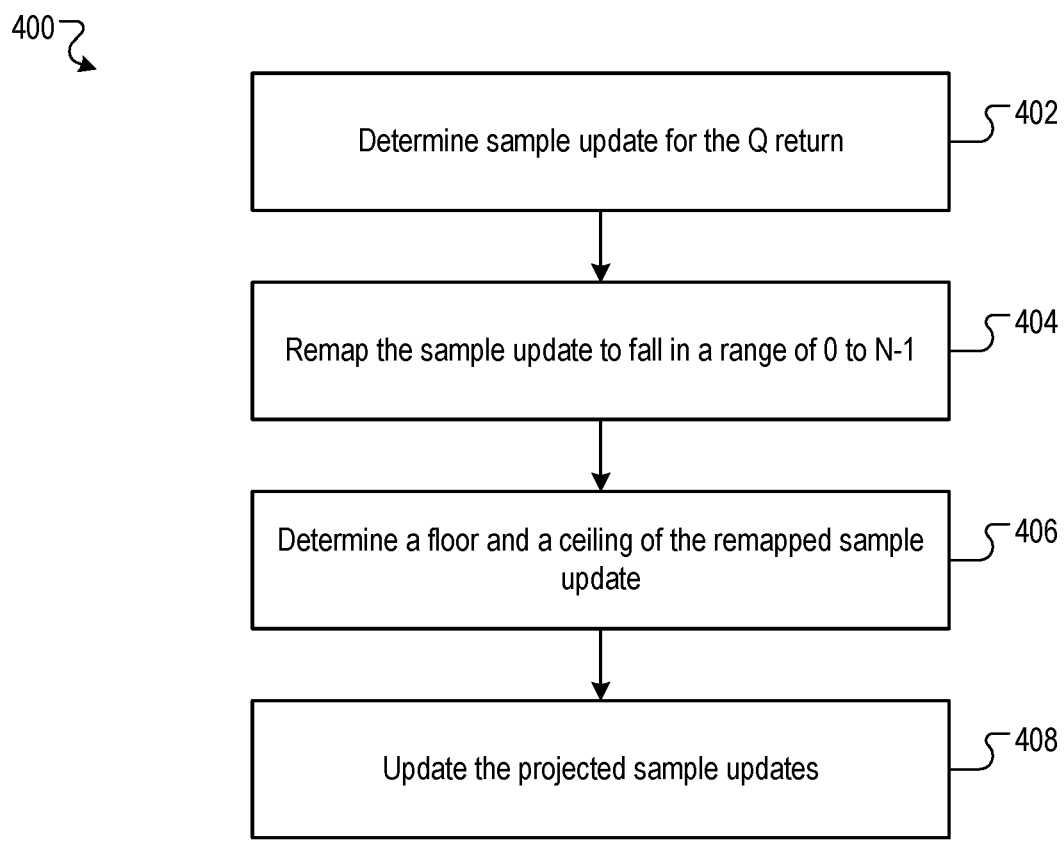
FIG. 4 is a flow diagram of an example process for determining projected sample updates for Q returns during training of a reinforcement learning system.

FIG. 4 is a flow diagram of an example process for determining projected sample updates for Q returns during training of a reinforcement learning system. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The description of the process 400 which follows is described with reference to a particular Q return. To determine the projected sample updates, the system may perform the steps of the process 400 for each Q return in the set of possible Q returns. The description of the process 400 assumes the set of possible Q returns is a discrete set.

The system determines a sample update for the Q return (402). The sample update for the Q return is a numerical value. The system may determine the sample update for the Q return based on the current reward (i.e., of the experience tuple, as described in 302), a discount factor (i.e., a numerical value between 0 and 1), and the Q return itself. For example, the system may determine the sample update $\mathcal{T}q$ for the Q return q to be:

$$\mathcal{T}q = r + \gamma \cdot q \qquad (5)$$

where r is the current reward and $\gamma$ is the discount factor. In some cases, the system may determine the sample update for the Q return subject to the constraints that: (i) the sample update is greater than a smallest Q return in the set of possible Q returns, and (ii) the sample is less than a largest Q return in the set of possible Q returns. For example, the system may clip the sample update to be in the range [a, b], where a is the smallest Q return in the set of possible Q returns and b is the largest Q return in the set of possible Q returns.

The system remaps (i.e., transforms) the sample update to fall in a range of 0 to N−1, where the Q returns are indexed from 0 to N−1, and N is a positive integer (404). For example, the system may determine the remapped sample update b by the relationship:

$$b = \frac{\mathcal{T} q - V_{MIN}}{\Delta q} \tag{6}$$

where $\mathcal{T}$ q is the sample update, $V_{MIN}$ is a smallest Q return in the set of possible Q returns, and $\Delta q$ is an increment separating the Q returns (i.e., for each $i \in \{1, \ldots, N-1\}$, $q_i - q_{i-1} = \Delta q$).

The system determines a floor and a ceiling of the remapped sample update (406). The floor of the remapped sample update is defined as the maximum integer value that is less than the remapped sample update. The ceiling of the remapped sample update is defined as the minimum integer value that is greater than the remapped sample update.

The system updates the projected sample updates (408). As described previously, to determine the projected sample updates, the system can perform the steps of the process 400 for each Q return in the set of possible Q returns. The values of the projected sample updates may be initialized (i.e., prior to the system performing the steps of the process 400 for any of the Q returns in the set of possible Q returns), e.g. to have value 0. Each time the system performs the steps of the process 400, in particular step 408, the values of the projected sample updates for one or more Q returns are updated.

The system may update the projected sample updates by distributing the probability of the Q return in the next probability distribution for the argmax action-next training observation pair (i.e., as determined in 306) to one or more projected sample updates. That is, the system may increase the values of one or more projected sample updates based on the probability of the Q return in the next probability distribution for the argmax action-next training observation pair. In some cases, the system may distribute the probability of the Q return in the next probability distribution for the argmax action-next training observation pair with a strength that is based on, for each projected sample update, the distance between the sample update for the Q return (i.e., as determined in 402) and the corresponding Q return for the projected sample update. Distributing the probability of the Q return in the next probability distribution for the argmax action-next training observation pair refers to increasing the values of one or more projected sample updates based on the probability of the Q return.

For example, the system may update the projected sample update for the Q return having an index (i.e., in the range $\{0, \ldots, N-1\}$) that matches the floor of the remapped sample update (i.e., as determined in 406). In this example, the system can update the projected sample update for the Q return having an index that matches the floor of the remapped sample update based on: (i) the probability of the Q return in the next probability distribution for the argmax action-next training observation pair (i.e., as determined in 306), and (ii) a distance between the remapped sample update and the ceiling of the remapped sample update. For example, the system can update the projected sample update for the Q return having an index that matches the floor of the remapped sample update by the relationship:

$$m_l \leftarrow m_l + p \cdot (u-b) \tag{7}$$

where $m_l$ is the projected sample update for the Q return having index that matches the floor of the remapped sample update, p is the probability of the Q return in the next probability distribution for the argmax action-next training observation pair, u is the ceiling of the remapped sample update, and b is the remapped sample update.

As another example, the system may update the projected sample update for the Q return having an index (i.e., in the range $\{0, \ldots, N-1\}$) that matches the ceiling of the remapped sample update (i.e., as determined in 406). In this example, the system can update the projected sample update for the Q return having an index that matches the ceiling of the remapped sample update based on: (i) the probability of the Q return in the next probability distribution for the argmax action-next training observation pair (e.g., as determined in 306), and (ii) a distance between the remapped sample update and the floor of the remapped sample update. For example, the system can update the projected sample update for the Q return having an index that matches the ceiling of the remapped sample update by the relationship:

$$m_u \leftarrow m_u + p \cdot (b-l) \tag{8}$$

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for selecting an action to be performed by a reinforcement learning agent interacting with an environment, the method comprising:
    receiving a current observation characterizing a current state of the environment;
    for each action of a plurality of actions that can be performed by the agent to interact with the environment:
        processing the action and the current observation using a distributional Q network having a plurality of network parameters,
            wherein the distributional Q network is a deep neural network that is configured to process the action and the current observation in accordance with current values of the network parameters to generate a network output comprising a plurality of numerical values that collectively define a probability distribution over possible Q returns for the action current observation pair, wherein the network output comprises: (i) a respective score for each of a plurality of possible Q returns for the action current observation pair, or (ii) a respective value for each of a plurality of parameters of a parametric probability distribution over possible Q returns for the action-current observation pair, and
            wherein each possible Q return is an estimate of a return that would result from the agent performing the action in response to the current observation, and
        determining a measure of central tendency of the possible Q returns with respect to the probability distribution for the action-current observation pair; and
    selecting an action from the plurality of possible actions to be performed by the agent in response to the current observation using the measures of central tendency for the actions.

2. The method of claim 1, wherein selecting an action to be performed by the agent comprises:
    selecting an action having the highest measure of central tendency.

3. The method of claim 1, wherein selecting an action to be performed by the agent comprises:
    selecting an action having the highest measure of central tendency with probability $1\varepsilon$ and selecting an action randomly from the plurality of actions with probability $\varepsilon$.

4. The method of claim 1, wherein the measure of central tendency is a mean of the possible Q returns.

5. The method of claim 4, wherein determining the mean of the possible Q returns with respect to the probability distribution comprises:
    determining a respective probability for each of the plurality of possible Q returns from the network output;
    weighting each possible Q return by the probability for the possible Q return; and
    determining the mean by summing the weighted possible Q returns.

6. A method performed by one or more data processing apparatus for training a distributional Q network, the method comprising:
    obtaining an experience tuple that includes (i) a current training observation, (ii) a current action performed by an agent in response to the current training observation, (iii) a current reward received in response to the agent performing the current action, and (iv) a next training observation characterizing a state that an environment transitioned into as a result of the agent performing the current action;
    determining a respective current probability for each Q return of a plurality of possible Q returns, comprising:
        processing the current training observation and the current action using the distributional Q network and in accordance with current values of network parameters to generate a current network output comprising a plurality of numerical values that collectively define a current probability distribution over possible Q returns for the current action-current training observation pair, wherein the network output comprises: (i) a respective current score for each of a plurality of possible Q returns for the current action-current training observation pair, or (ii) a respective current value for each of a plurality of parameters of a parametric probability distribution over possible Q returns for the current action-current training observation pair;
    for each action in a plurality of actions:
        processing the action and the next training observation using a target distributional Q network and in accordance with current values of target network parameters of the distributional Q network to generate a next network output for the action-next training observation pair comprising a plurality of numerical values that collectively define a next probability distribution over possible Q returns for the action-next training observation pair, wherein the network output comprises: (i) a respective next score for each of a plurality of possible Q returns for the action-next training observation pair, or (ii) a respective next value for each of a plurality of parameters of a parametric probability distribution over possible Q returns for the action-next training observation pair, wherein the target distributional Q network has the same neural network architecture as the distributional Q network but the current values of the target network parameters are different from the current values of the network parameters; and determining a measure of central tendency of the possible Q returns with respect to the respective next probability distribution for the action-next training observation pair;

determining an argmax action, wherein the argmax action is an action from the plurality of actions for which the measure of central tendency of the possible Q returns is highest;

determining a respective projected sample update for each of the possible Q returns using the current reward and the argmax action;

determining a gradient with respect to the network parameters of a loss function that depends on the projected sample updates for the possible Q returns and the current probabilities for the possible Q returns; and updating the current values of the network parameters using the gradient.

7. The method of claim 6, wherein determining a respective projected sample update for each of the possible Q returns using the current reward and the argmax action comprises:

determining a respective sample update for each of the possible Q returns from the current reward; and determining the respective projected sample update for each of the possible Q returns from the respective sample updates and the probabilities in the next probability distribution for the argmax action-next training observation pair.

8. The method of claim 7, wherein the respective sample update for each of the possible Q returns is equal to the current reward plus a product of a discount factor and the possible Q return subject to a constraint that the respective sample update not be less than a smallest possible Q return of the plurality of possible Q returns and not be greater than a largest possible Q return of the plurality of possible Q returns.

9. The method of claim 7, wherein determining the respective projected sample update for each of the possible Q returns from the respective sample updates and the probabilities in the next probability distribution for the argmax action-next training observation pair comprises, for each possible Q return:

distributing the probability for the possible Q return in the next probability distribution for the argmax action-next training observation pair to at least some of the projected sample updates with a strength that is based on, for each projected sample update, the distance between the sample update for the possible Q return and the corresponding possible Q return for the projected sample update.

10. The method of claim 8, wherein the loss function is a Kullback-Leibler divergence between (i) the respective projected sample updates and (ii) the current probability distribution.

11. The method of claim 7, wherein the possible Q returns are indexed from 0 to N−1, and wherein determining the respective projected sample update comprises, for each particular possible Q return of the plurality of possible Q returns:

remapping the sample update for the particular possible Q return to fall in a range of 0 to N−1;

determining a floor and a ceiling of the remapped sample update;

updating the projected sample update for the possible Q return having an index that matches the floor based on the probability for the particular possible Q return in the next probability distribution for the argmax action-next training observation pair and on a distance between the remapped sample update and the ceiling; and updating the projected sample update for the possible Q return having an index that matches the ceiling based on the probability for the particular possible Q return in the next probability distribution for the argmax action-next training observation pair and on a distance between the remapped sample update and the floor.

12. The method of claim 11, wherein the loss function is a negative of a sum of, for each possible Q return, the projected sample update for the possible Q return and a logarithm of the current probability for the possible Q return.

13. The method of claim 6, further comprising:

periodically updating the values of the target network parameters to match the values of the network parameters.

14. The method claim 6, further comprising:

updating the current values of the target network parameters by interpolating between the current values of the target network parameters and the updated values of the network parameters.

15. A non-transitory computer program product storing instructions that when executed by one or more computers cause the one or more computers to perform operations for training a distributional Q network, the operations comprising:

obtaining an experience tuple that includes (i) a current training observation, (ii) a current action performed by an agent in response to the current training observation, (iii) a current reward received in response to the agent performing the current action, and (iv) a next training observation characterizing a state that an environment transitioned into as a result of the agent performing the current action;

determining a respective current probability for each Q return of a plurality of possible Q returns, comprising:

processing the current training observation and the current action using the distributional Q network and in accordance with current values of network parameters to generate a current network output comprising a plurality of numerical values that collectively define a current probability distribution over possible Q returns for the current action-current training observation pair, wherein the network output comprises: (i) a respective current score for each of a plurality of possible Q returns for the current action-current training observation pair, or (ii) a respective current value for each of a plurality of parameters of a parametric probability distribution over possible Q returns for the current action-current training observation pair;

for each action in a plurality of actions:

processing the action and the next training observation using the distributional Q network and in accordance with the current values of the network parameters to generate a next network output for the action-next training observation pair comprising a plurality of numerical values that collectively define a next probability distribution over possible Q returns for the action-next training observation pair, wherein the network output comprises: (i) a respective next score for each of a plurality of possible Q returns for the action-next training observation pair, or (ii) a respective next value for each of a plurality of parameters of a parametric probability distribution over possible Q returns for the action-next training observation pair; and determining a measure of central tendency of the possible Q returns with respect to the respective next probability distribution for the action-next training observation pair;

determining an argmax action, wherein the argmax action is an action from the plurality of actions for which the measure of central tendency of the possible Q returns is highest;

determining a respective projected sample update for each of the possible Q returns using the current reward and the argmax action;

determining a gradient with respect to the network parameters of a loss function that depends on the projected sample updates for the possible Q returns and the current probabilities for the possible Q returns; and updating the current values of the network parameters using the gradient.

16. The non-transitory computer program product of claim 15, wherein determining a respective projected sample update for each of the possible Q returns using the current reward and the argmax action comprises:

determining a respective sample update for each of the possible Q returns from the current reward; and determining the respective projected sample update for each of the possible Q returns from the respective sample updates and the probabilities in the next probability distribution for the argmax action-next training observation pair.

17. The non-transitory computer program product of claim 16, wherein the respective sample update for each of the possible Q returns is equal to the current reward plus a product of a discount factor and the possible Q return subject to a constraint that the respective sample update not be less than a smallest possible Q return of the plurality of possible Q returns and not be greater than a largest possible Q return of the plurality of possible Q returns.

18. The non-transitory computer program product of claim 16, wherein determining the respective projected sample update for each of the possible Q returns from the respective sample updates and the probabilities in the next probability distribution for the argmax action-next training observation pair comprises, for each possible Q return:

distributing the probability for the possible Q return in the next probability distribution for the argmax action-next training observation pair to at least some of the respective projected sample updates with a strength that is based on, for each projected sample update, the distance between the sample update for the possible Q return and the corresponding possible Q return for the projected sample update.

19. The non-transitory computer program product of claim 17, wherein the loss function is a Kullback-Leibler divergence between (i) the respective projected sample updates and (ii) the current probability distribution.

20. The non-transitory computer program product of claim 16, wherein the possible Q returns are indexed from 0 to N−1, and wherein determining the respective projected sample update comprises, for each particular possible Q return of the plurality of possible Q returns:

remapping the sample update for the particular possible Q return to fall in a range of 0 to N−1;

determining a floor and a ceiling of the remapped sample update;

updating the projected sample update for the possible Q return having an index that matches the floor based on the probability for the particular possible Q return in the next probability distribution for the argmax action-next training observation pair and on a distance between the remapped sample update and the ceiling; and updating the projected sample update for the possible Q return having an index that matches the ceiling based on the probability for the particular possible Q return in the next probability distribution for the argmax action-next training observation pair and on a distance between the remapped sample update and the floor.

21. The non-transitory computer program product of claim 20, wherein the loss function is a negative of a sum of, for each possible Q return, the projected sample update for the possible Q return and a logarithm of the current probability for the possible Q return.

22. A non-transitory computer program product storing instructions that when executed by one or more computers cause the one or more computers to perform operations for selecting an action to be performed by a reinforcement learning agent interacting with an environment, the operations comprising:

receiving a current observation characterizing a current state of the environment;

for each action of a plurality of actions that can be performed by the agent to interact with the environment:

processing the action and the current observation using a distributional Q network having a plurality of network parameters, wherein the distributional Q network is a deep neural network that is configured to process the action and the current observation in accordance with current values of the network parameters to generate a network output comprising a plurality of numerical values that collectively define a probability distribution over possible Q returns for the action-current observation pair, wherein the network output comprises: (i) a respective score for each of a plurality of possible Q returns for the action-current observation pair, or (ii) a respective value for each of a plurality of parameters of a parametric probability distribution over possible Q returns for the action-current observation pair, and wherein each possible Q return is an estimate of a return that would result from the agent performing the action in response to the current observation, and determining a measure of central tendency of the possible Q returns with respect to the probability distribution for the action-current observation pair; and selecting an action from the plurality of possible actions to be performed by the agent in response to the current observation using the measures of central tendency for the actions.

\* \* \* \* \*